US010437507B2

(12) United States Patent
Tormasov et al.

(10) Patent No.: US 10,437,507 B2
(45) Date of Patent: Oct. 8, 2019

(54) SYSTEM AND METHOD FOR GENERATING BACKUP OF PERSONALIZED USER DATA

(71) Applicant: Acronis International GmbH, Schaffhausen (CH)

(72) Inventors: Alexander G. Tormasov, Moscow (RU); Mark Shmulevich, Moscow (RU); Serguei S. Beloussov, Singapore (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 215 days.

(21) Appl. No.: 15/260,558

(22) Filed: Sep. 9, 2016

(65) Prior Publication Data

US 2017/0075584 A1    Mar. 16, 2017

Related U.S. Application Data

(60) Provisional application No. 62/218,349, filed on Sep. 14, 2015.

(51) Int. Cl.
| G06F 12/00 | (2006.01) |
| G06F 3/06 | (2006.01) |
| H04L 29/06 | (2006.01) |
| H04L 29/08 | (2006.01) |

(52) U.S. Cl.
CPC ............ *G06F 3/065* (2013.01); *G06F 3/0619* (2013.01); *G06F 3/0643* (2013.01); *G06F 3/0683* (2013.01); *H04L 63/0428* (2013.01); *H04L 67/10* (2013.01)

(58) Field of Classification Search
CPC combination set(s) only.
See application file for complete search history.

(56) References Cited

U.S. PATENT DOCUMENTS

| 2008/0033922 | A1* | 2/2008 | Cisler | ............... G06F 17/30693 |
| 2010/0071053 | A1* | 3/2010 | Ansari | .................. G06Q 30/04 |
|  |  |  |  | 726/12 |
| 2011/0252071 | A1* | 10/2011 | Cidon | ............... G06F 17/30174 |
|  |  |  |  | 707/802 |

* cited by examiner

*Primary Examiner* — Baboucarr Faal
(74) *Attorney, Agent, or Firm* — Arent Fox LLP; Michael Fainberg

(57) ABSTRACT

A system and method that provides for the backup and recovery of personalized user data. An exemplary method includes storing user data files in electronic memory of a user device, continuously tracking user actions by one or more user devices to detect interact with at least one external resource; determining whether the tracked user actions have modified one or more of the plurality of user data files; and if the processor determines that the tracked user actions have modified a user data file, storing the modified user data file in a data storage system.

23 Claims, 6 Drawing Sheets

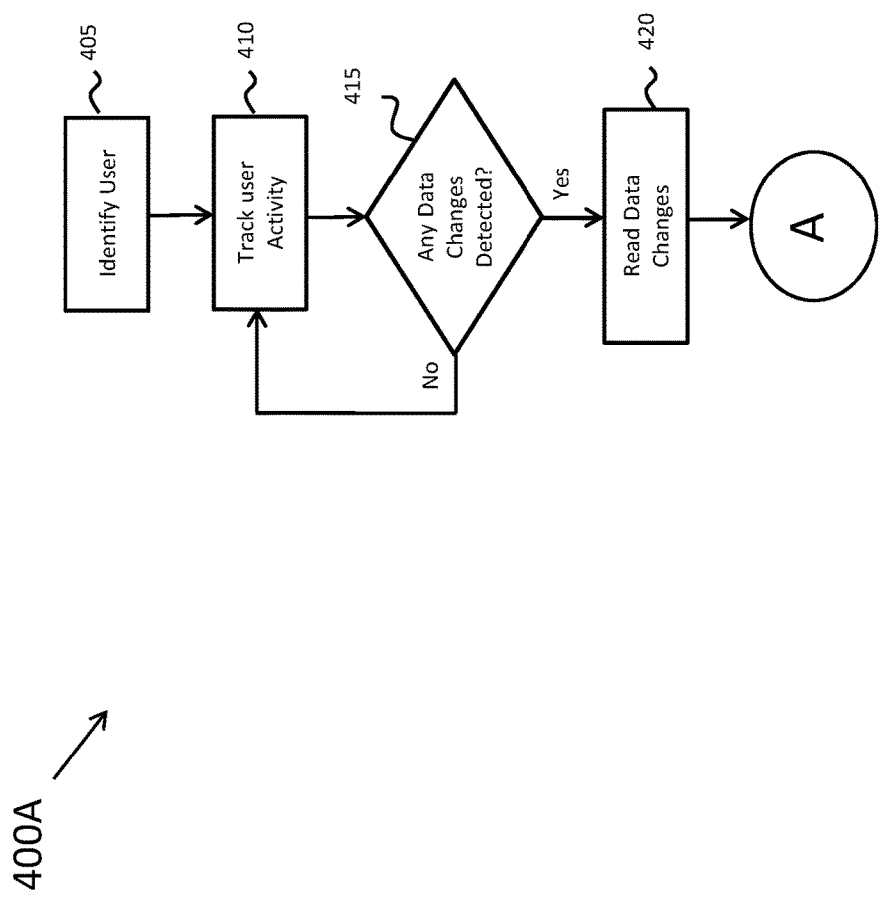

SYSTEM AND METHOD FOR GENERATING BACKUP OF PERSONALIZED USER DATA

CROSS REFERENCE TO RELATED APPLICATIONS

The present application claims priority to U.S. Provisional Application Ser. No. 62/218,349, filed Sep. 14, 2015, and entitled "Backup of Personalized User Data", the entire contents of which are hereby incorporated by reference.

FIELD OF TECHNOLOGY

The present disclosure generally relates to data storage, and, more, specifically, to a system and method for backup and recovery of personalized electronic user data.

BACKGROUND

As the popularity of computing devices and mobile computing devices (e.g., smartphones) increases and the applications for these devices continue to develop with diversified functions, more and more users are using these devices for the purposes of connecting to the Internet, taking pictures, listening to music, watching movies, sharing information, and the like. Although these computing devices improve the convenience of our life, the data stored in the devices becomes increasingly large, and there are significant issues such as the privacy of a user and the confidentiality of data.

Moreover, when a user works with such a computer or mobile device, the user constantly modifies or creates different files and objects (e.g., some local, some remote)—by writing messages, posting forum/blog entries, taking pictures, loading pictures from other sources, and the like. Further, the data relating to these actions is not separately recorded for a backup for the particular user. Rather, a conventional backup utility only deals with modified files over a period of time on a particular computer system (or a mobile device) and writes them into the backup. The conventional backup utility is not concerned with any personal user data such as, for example, data reflecting who has created or modified or downloaded the files. In other words, the conventional backup is focused on restoration of a previous state of the computer system (or a mobile device) as a whole rather than focusing on the personal user data.

SUMMARY

Accordingly, the system and method disclosed herein provides for the backup and recovery of personalized user data that substantially obviates one or more of the disadvantages of the related art.

In one aspect of the invention a personalized data backup application logs all user actions performed with his files. Then, only user files are backed up for recovery, enabling a user to see states of his files at different points in time. All files modified by user actions (such as sending messages, uploading images or videos, taking pictures/videos, posting on social networks or in the chats, and the like) are detected according to an exemplary aspect. These files can be located on user's mobile device or computer system and can be modified by user actions directly or indirectly. The detected modified files are written into storage, which can be performed either after each user action or periodically. Moreover, the backup files can be encrypted using a private key known only to the user and stored on cloud storage.

Thus, in one aspect, a method is disclosed for backing up electronic user data. In this aspect, the method includes storing a plurality of user data files in electronic memory of at least one user device of a plurality of user devices; continuously tracking, by a processor, user actions by at least one of the plurality of user devices to interact with at least one external resource; determining, by the processor, whether one or more the tracked user actions has modified at least one of the plurality of user data files; and if the processor determines that the one or more tracked user actions has modified the at least one user data file, storing the modified at least one user data file in a data storage system separate from the electronic memory.

In another aspect, the data storage system is a remote cloud storage system and the method further comprises encrypting the modified at least one user data file.

In another aspect, the determining of whether the one or more the tracked user actions has modified the at least one user data file comprises detecting changes in the at least one user data file stored in the electronic memory as a result of an intentional modification by the user of the at least one user device.

In another aspect, the method includes discarding the modified at least one user data file if the changes in the at least one user data file are determined to be unintentional.

In another aspect, the continuously tracking of user actions comprises continuously tracking the plurality of user devices to detect interactions with the at least one external resource.

In another aspect, the at least one external resource comprises at least one of an online blog, an online social networks, an online shopping environment, an online banking environment, and an online gaming system.

In another aspect, the method includes verifying an identity of the user of the tracked at least one user device by: identifying at least one of user credentials of the at least one external resource and official personal identification information; and comparing the identified at least one of user credentials and the official personal identification information with verified user identification information stored in the electronic memory.

In another aspect, the method includes creating metadata relating to the user actions of interacting with the at least one external resource that modified the at least one user data file; and storing the metadata with the modified at least one user data file in the data storage system.

In another aspect, the method includes generating a user profile based on the metadata relating to the user actions.

In another aspect, the plurality of user data files comprises at least one of digital images, video, electronic messages and cell phone data.

In another aspect, the method continuously tracks user actions that interact with the at least one external resource and are performed by a device other than the at least one user device.

In another aspect, a system is provided for backing up electronic user data. In this aspect, the system includes electronic memory configured to store a plurality of user data files of at least one user device of a plurality of user devices; and a processor configured to: continuously track user actions by at least one of the plurality of user devices to interact with at least one external resource, determine whether one or more the tracked user actions has modified at least one of the plurality of user data files, and if the processor determines that the one or more tracked user actions has modified the at least one user data file, transmit the modified at least one user data file to a data storage system separate from the electronic memory to be stored thereon.

In another aspect, a non-transitory computer readable medium storing computer executable instructions is provided for backing up electronic user data. In this aspect, instructions are provided for: storing a plurality of user data files in electronic memory of at least one user device of a plurality of user devices; continuously tracking user actions by at least one of the plurality of user devices to interact with at least one external resource; determining whether one or more the tracked user actions has modified at least one of the plurality of user data files; and if the one or more tracked user actions are determined to have modified the at least one user data file, storing the modified at least one user data file in a data storage system separate from the electronic memory.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 4A and 4B illustrate a flowchart for a method for backup and recovery of personalized electronic user data according to an exemplary aspect.

DETAILED DESCRIPTION

Figure 1:
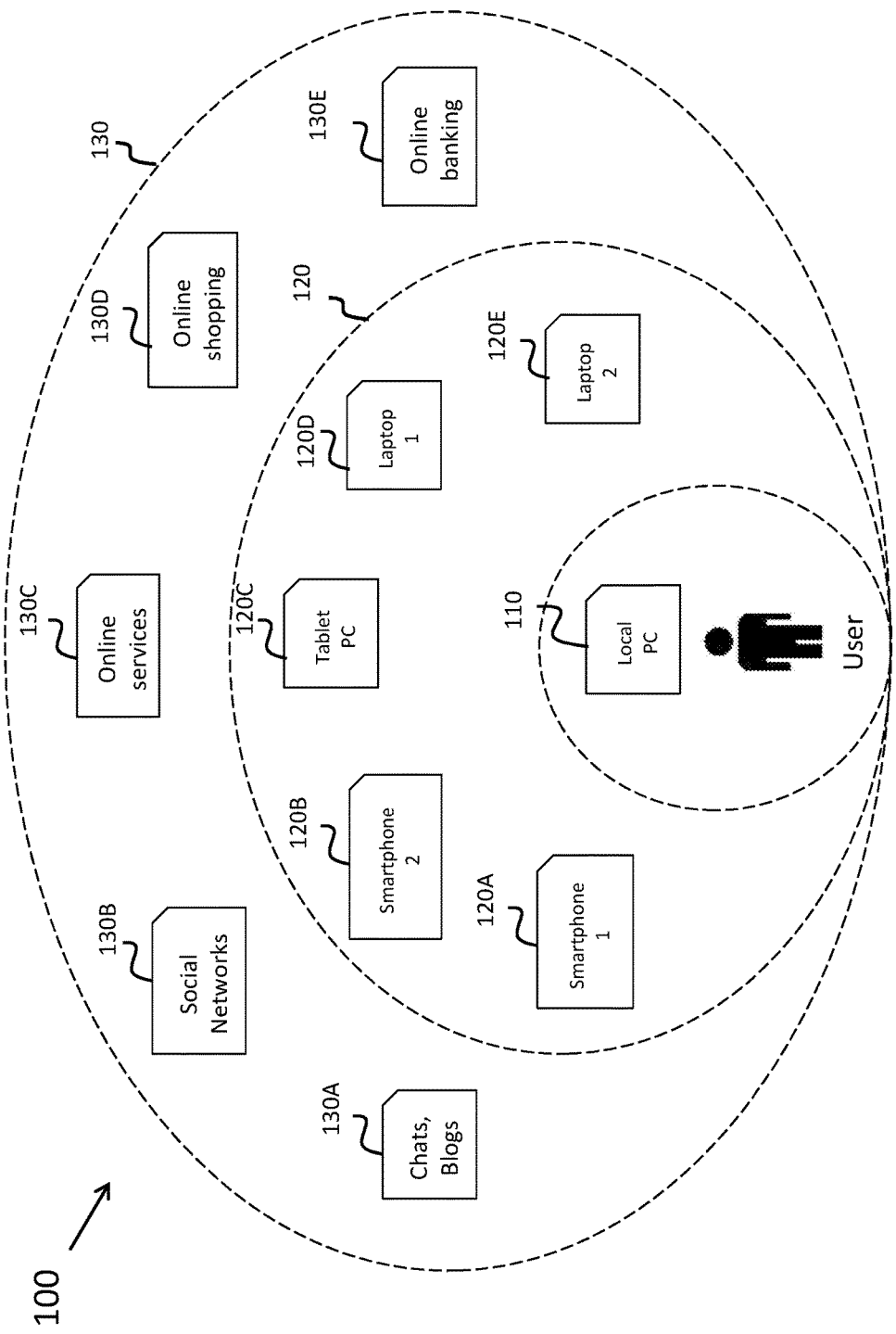
FIG. 1 illustrates a block diagram of a general infrastructure for a personalized backup according to an exemplary aspect of the disclosed system and method.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1 illustrates a block diagram of a general infrastructure 100 for a personalized backup according to an exemplary aspect of the disclosed system and method. In general, the disclosed system utilizes a local personal computer ("PC") 110 of the user that implements one or more personalized data backup applications that are configured to log some (preferably all) user actions performed with the user's electronic computer files. Then, only the modified user files are backed up for recovery, which enables the user to see states of the user files at different points in time, for example.

According to the exemplary aspect, all the files modified by the user actions (e.g., sending messages, uploading images or videos, taking pictures/videos, posting on social networks or in chats, forums or blogs, and the like) are detected. In one aspect, these files can be located on the user's mobile device(s) or computer system(s), for example. Moreover, the files can be modified by user actions indirectly. As will be discussed in greater detail below, the detected modified files are written into storage fully or incrementally, which can be performed dynamically (i.e., after each user action) or periodically. Moreover, in one aspect, the backup files can be encrypted using a private key known only to the user and stored on cloud storage.

As shown in FIG. 1, the local PC 110 is provided to manage the data of a plurality of user devices, including the PC 110 itself, as well as a plurality of secondary devices (i.e., "personal" devices 120). For example, the user can have a first smartphone 120A, a second smartphone 120B, a tablet PC 120C, a first laptop 120D and a second laptop 120E. Of course it should be appreciated that these five personal devices are shown in FIG. 1 only for illustrative purposes.

Moreover, it should be understood that the user can use the local PC 110 and/or one or more of the secondary personal devices 120A-120E to contact and/or interact with third party services 130 (i.e., "external resources"), such as the Internet, websites, and the like. Thus, according to an exemplary aspect, user activity in blogs 130A and social networks 130B is detected in order to determine which user files on the various devices have been modified. Moreover, the system can monitor activity on certain online services 130C, including online shopping 130D and/or online banking 130E, as well as other services such an online gaming systems (e.g., Pokemon Go™).

In these aspects, user actions, for example, on sites of social network 130B can be intercepted and the associated data (e.g., messages, discussion threads, images, videos etc.) can be stored and copied into a backup, as will be discussed in detail below. In one aspect, all user modifications can be detected by crawlers or search bots that can detect all modifications made by a user in a certain volume or directory, for example. All these files are checked for their uniqueness and added to the backup when changes have been detected. If several modifications have been done by the user, the entire history of the file(s) is stored, according to one aspect. Moreover, in a further refinement of the aspect, the system is configured to store only user-modified data as opposed to storing all data of a web page accessed by the user (i.e., for example, together with some website identifying data).

It should be appreciated that certain user data can be affected by user actions indirectly. For example, if a user posts some comment to an already existing post or several posts, the system can identify the original (i.e., initial post and possibly some other parts) and the initial post can be included into a backup for clarity and recovery efficiency, for example. Moreover, according to one aspect, all application files on the computer system (e.g., local PC 110) or mobile device (e.g., smartphone 120B) affected by user interaction with the computer or device are detected and stored into the backup. Additionally, any user modifications to the configuration files that occur during the user session are recorded. In one aspect, some (and preferably all) of these files are identified (i.e., detected) by the detection algorithm, including using heuristic and other detection rules.

Figure 2:
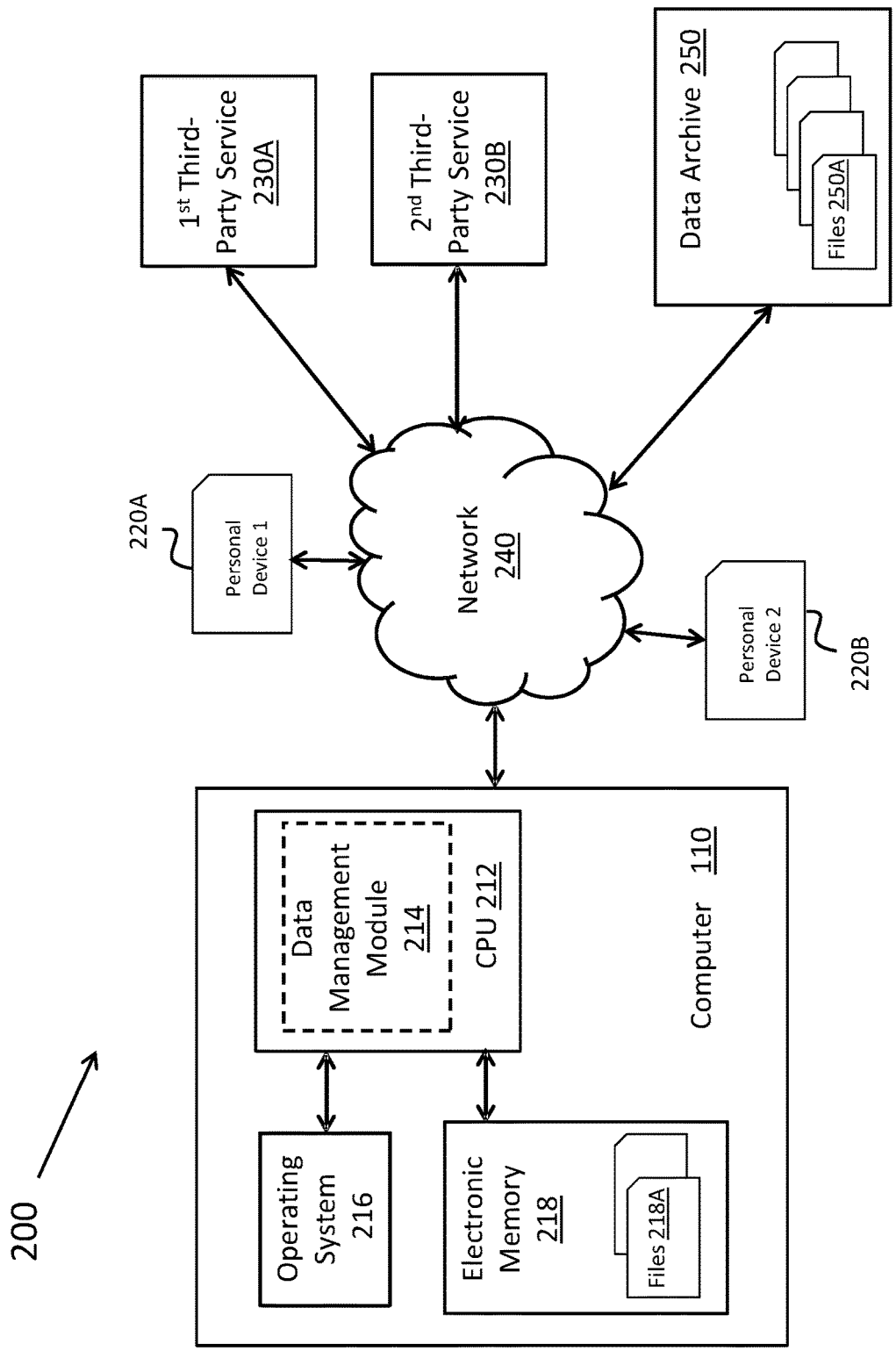
FIG. 2 illustrates a block diagram of a system for backup and recovery of personalized electronic user data according to an exemplary aspect.

FIG. 2 illustrates a block diagram of a system for backup and recovery of personalized electronic user data according to an exemplary aspect. As shown, the system 200 generally includes a computer 110, which can correspond to the local PC 110 shown in FIG. 1 and discussed above. The details of the computer 110 will be discussed below with respect to FIG. 3, but generally the computer 110 is configured to detect user actions and manage the storage of related user data as described herein. Moreover, according to the exemplary aspect, the computer 110 may be any type of computing device, such as a laptop, a desktop, a tablet, a mobile phone and the like. The specific hardware details of the exemplary computer 110 will be described below with respect to FIG. 5.

As further shown, the system 200 includes a plurality of personal devices 220A and 220B (e.g., user gadgets and the like). The personal devices 220A and 220B corresponds to one or more of the secondary personal devices 120A-120E shown in FIG. 1 and discussed above. Moreover, the computer 110 is configured to detect and identify each of the plurality of personal devices 220A and 220B using known public accounts of the user, such as Google®, Microsoft®, Apple® ID, and the like.

Furthermore, in the exemplary aspect, the personal devices 220A and 220B are configured to communicate with the computer 110 over a network 240 using conventional communication techniques and protocols. The applicable network 240 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

In addition, a plurality of third-party services (i.e., first and second third-party services 230A and 230B) are also communicatively coupled to the system 200 by network 240. According to the exemplary aspect, the third-party services 230A and 230B correspond to one or more of blogs 130A (i.e., forums, chat rooms and blog); social networks 130B (e.g., Facebook®, Twitter®, Instagram®, LinkedIn®, and the like); online services 130C, including online multimedia services (e.g., YouTube®, Flickr®, and the like) and online data storages (e.g., Dropbox®, OneDrive®, Google Drive®, and the like); online shopping 130D; and/or online banking 130E. According to the exemplary aspect, the computer 110 is further configured to detect user activities across global networks relating to one of the third-party services 230A and 230B, as will be discussed in detail below. In yet a refinement of this aspect, the computer 100 can further detect user activities by monitoring MMS/SMS messages, for example.

Referring back to the computer 110, the computer 110 includes an operating system 216 and a central processing unit ("CPU") 212 provided to, among other things, execute data management module 214. In this aspect, the data management module 214 includes software code (e.g., processor executable instructions) in memory, which may be configured to execute/facilitate the storing and managing of user data according to the exemplary aspects described herein.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the computer 110 and/or CPU 212 and/or one of the specific modules as shown to perform the various steps of the algorithm.

As further shown in FIG. 2, the computer 110 includes electronic memory 218 that stores electronic data, for example, data files 218A, which can be one or several types of personal data, such as user data including files, documents, pictures, videos, and the like. Moreover, according to an exemplary aspect, the electronic memory 218 can be a computer-readable medium includes data storage, and, by way of example, and not limitation, can comprise RAM, ROM, EEPROM, CD-ROM, Flash memory or other types of electric, magnetic, or optical storage medium, or any other medium.

According to the exemplary aspect, the data management module 214 is configured to detect and identify all information relating to a user of the computer 110 and then back up all modified user-related data to a remote data storage device, such as data archive 250, which can be cloud storage, for example.

It is contemplated that data archive 250 can be any type of remote file storage system, such as an online/remote file storage service or cloud computing service. Examples of such services include Amazon® Simple Storage Service ("S3"), and Microsoft® Azure ("Azure"). In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

According to the exemplary aspect, computer 110 is configured to transmit to and store personal data on the data archive 250 via network 240 where the data archive 250 is preferably a cloud computing service. However, it should be appreciated that while data archive 250 is described as an online/remote file storage service (e.g., a cloud computing service), data archive 250 can be incorporated into a local area network or the like, directly coupled to computer 110, as should be appreciated to those skilled in the art.

Once the computer 110, and, more particularly, the data management module 214 identifies the user activities, the user files (e.g., files 218A stored in memory 218) modified by these activities directly or indirectly are identified and stored for backup in data archive 250. Moreover, the data management module 214 is also preferably configured to detect the file(s) directly affected by the user interactions with the particular device, such as a PC, laptop, tablet or smartphone (i.e., the personal devices 220A and/or 220B). It should be appreciated that while the exemplary aspect is described with regard to detected changes in user files 218A on computer 110 in response to certain detected user activities, that the modified files could be stored on one or more of the secondary personal devices (e.g., the personal devices 220A and/or 220B) according to an alternative aspect or in combination with the exemplary aspect. Moreover, in addition to the modified user data that is backed up on the data archive 250, the system can further be configured to store metadata relating to the user actions that resulted in the modified user files, including the time of the action, the type of the action, who performed the action, and the like. In this manner, the user can obtain a complete snapshot of the history of the file and its various modifications. Thus, in this aspect, the metadata relating to user actions as to how the file was modified is stored together with the modified file in the data archive 250.

Figure 3:
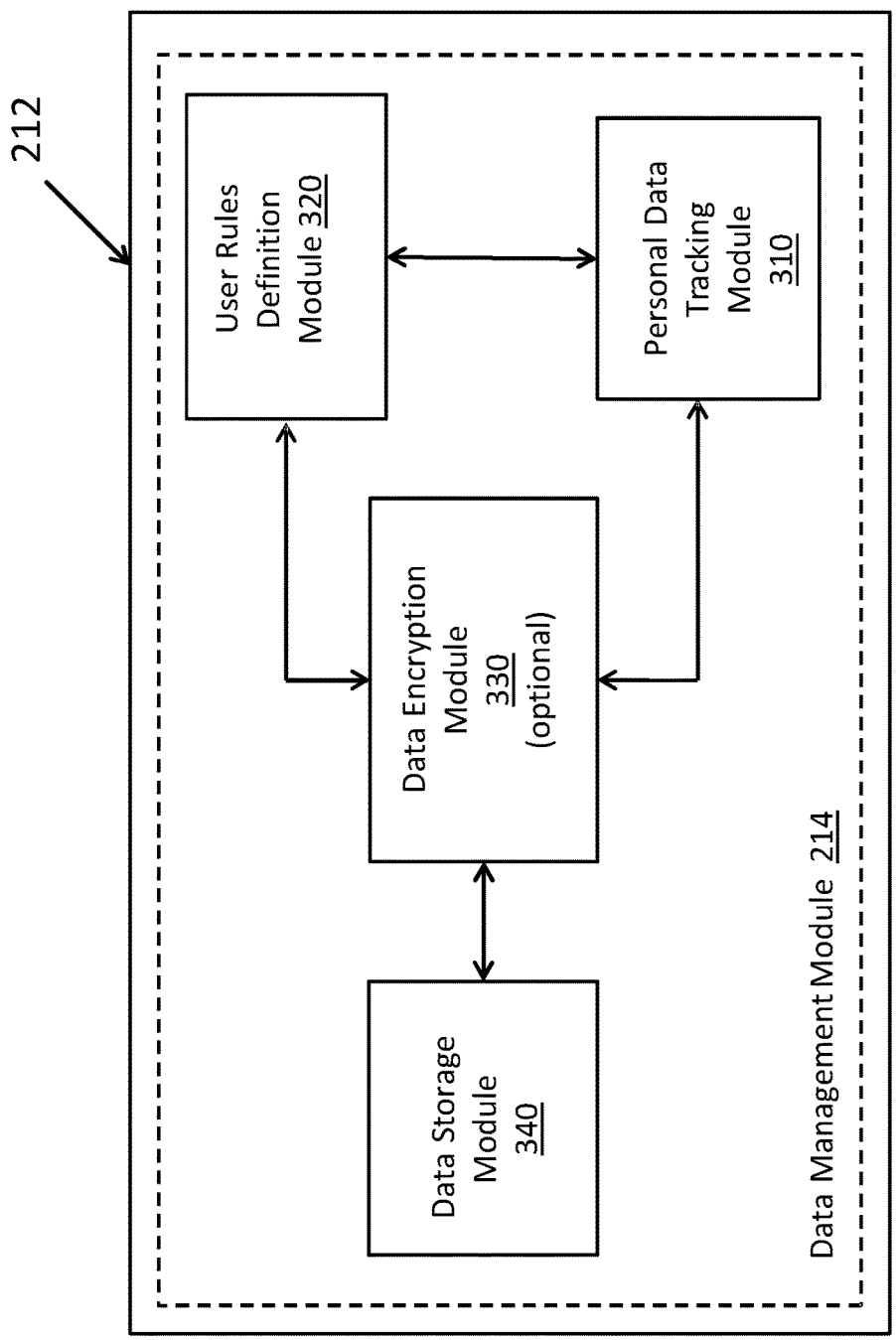
FIG. 3 illustrates a block diagram of a computer for backup and recovery of personalized electronic user data according to an exemplary aspect.

As further described above, the computer includes a CPU 110 is configured to execute data management module 214 that is configured to perform the algorithms described below for reliable data storage and efficient storage of user data. As shown in FIG. 3, the data management module 214 can be composed of a plurality of modules.

In particular, the data management module 214 can include personal data tracking module 310, user rules definition module 320, data encryption module 330 and data storage module 340. For purposes of the disclosure below with respect to the exemplary algorithms, the disclosure generally refers to the computer 110, the data management module 214 and/or one or more of the sub-modules shown in FIG. 3 as performing the various steps, but it should be appreciated that the applicable modules shown are provided to perform such steps according to an exemplary aspect.

Specific exemplary aspects of each sub-module 310-340 will be described in more detail below with respect to the disclosed algorithms. However, generally the personal data tracking module 310 is configured to monitor the computer 110 and/or secondary personal devices (e.g., device 220A and/or 220B) to detect interactions with external resources, such as services 130A-130E described above with respect to FIG. 1. For example, these interactions may be a user's action using a smartphone to post a picture on a social media website and respond to a post. In this example, the personal data tracking module 310 is further configured to identify, which, if any personal user data (e.g., files) stored on the computer 110 (e.g., files 218A) and/or one or more secondary personal devices were modified as a result of this interaction/user action. Moreover, data encryption module 330 is configured to encrypt the modified files and data storage module 340 is configured to communicate with the data archive 250 by sending modified user files to the remote data storage to be stored as backed up files. In an alternative aspect, the encryption process may be performed directly by data archive 250 after receiving the modified user files, as will be discussed in detail below. Yet further, user rules definition module 320 functions as a rules engine that enables the user to define rules as to the operation of personal data tracking module 310. In other words, the user rules definition module 320 enables a user to define which devices are tracked and which external resources are tracked to determine whether the user is interacting with such resources using a tracked device, for example. The details and exemplary variations of the modules will be described in more detail below.

Figure 4B:
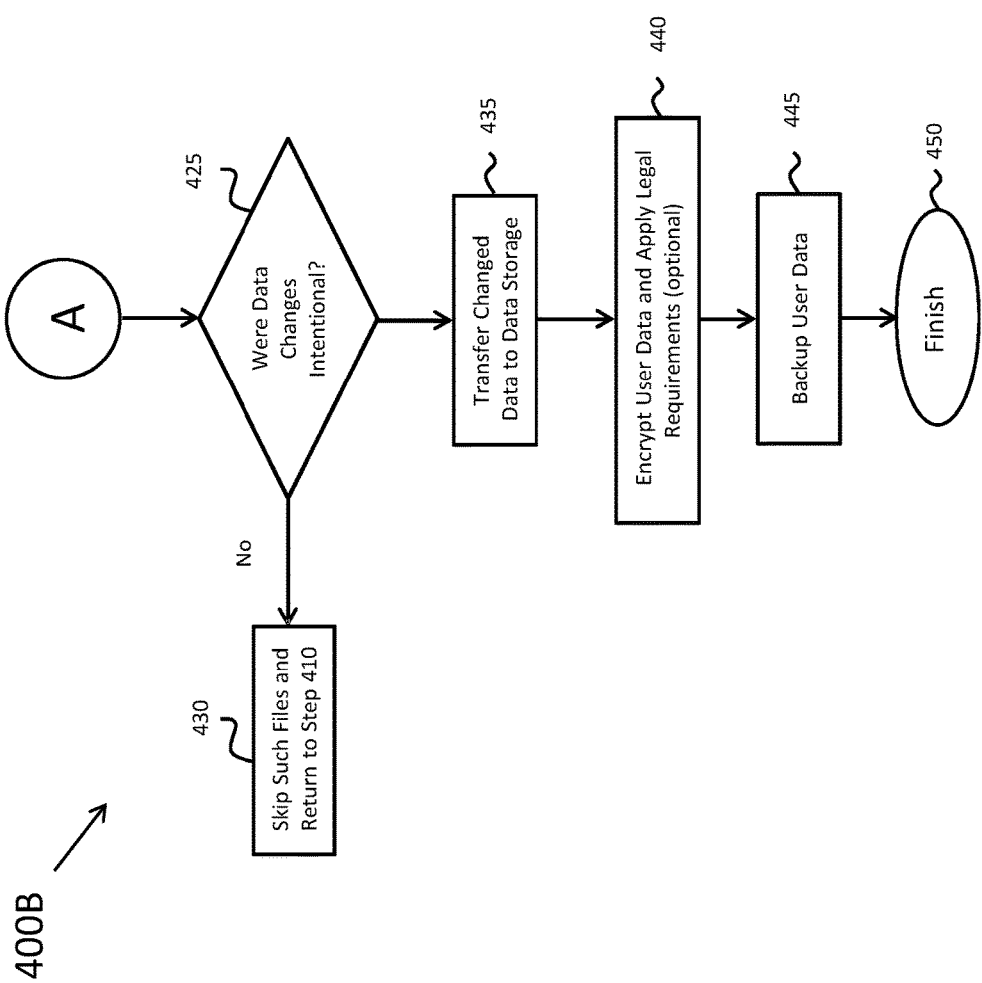

FIGS. 4A and 4B illustrate a flowchart for a method for backup and recovery of personalized electronic user data according to an exemplary aspect. First, as shown in FIG. 4A, the computer 110 identifies the user at step 405 of one or more personal devices (e.g., device 220A and/or 220B) and the personal devices interaction with a third-party service (e.g., a social network 130B). In particular, the one or more secondary personal devices can be linked (e.g., defined by a user) using personal data tracking module 310 to the computer 110. Preferably, this designation is performed before the actual processing of the data management method using the user rules definition module 320, as described above. Thus, when one more of these secondary devices (e.g., 120A-120E) begins interacting with one or more Internet/third-party services (e.g., services 130A-130E), the personal data tracking module 310 is configured to identify certain user identification data to confirm that the user identified at step 405 is the actual user of computer 110 (and/or second devices) and, more particularly, the user of files 218A stored in electronic memory 218 of computer 110.

For example, the personal data tracking module 310 is configured to identify at least one of: (1) user credentials (e.g., logins/passwords) for the web accounts, services, etc.; (2) official personal identifications (e.g., registered accounts for any official, federal, government, municipal service, and the like); and/or any confirmed public accounts (e.g., OpenID or social network accounts, such as Facebook®, LinkedIn®, or the like). The personal data tracking module 310 can then compare the user identification information with valid/existing user identification information stored in electronic memory 218, for example, to confirm the identity of the user.

Next, at step 410, the personal data tracking module 310 begins tracking the user activity on one or more of these third-party services. For example, if the user is interacting on a social network 130B (e.g., Facebook), the personal data tracking module 310 can intercept user actions and the associated data (e.g., messages, discussion threads, images, videos etc.) using crawlers or search bots that can detect all modifications made by a user in a certain volume or directory, for example. Based on detected user activities, the personal data tracking module 310 is further configured to detect any actual changes in user data (e.g., files 218A) at step 415. If no actual changes in the user data have been detected, the method returns to step 410. Alternatively, if changes have been detected, the personal data tracking module 310 further reads or analyses these changes at step 420. Moreover, it is noted that while step 410 of tracking user activity is shown as occurring after the user is identified at step 405, in an alternative aspect, the user activity can first be tracked (e.g., by tracking a specific device's action), and if any actions are detected, the disclosed algorithm can then very user identity.

In any event, as further shown in FIG. 4B, the personal data tracking module 310 determines whether the data changes were intentional at step 425. In other words, the personal data tracking module 310 is configured to determine if the data files on the user device were changed intentionally in that the user has changed configurations or downloaded some files, for example. In one aspect, the system can classify the applications with which user usually works (e.g., word processing applications, image processing applications, creating and modifying files, and the like) and set up policies or rules that execution of operations in these applications are indicative that the files (e.g., documents, pictures and the like) are modified intentionally. Alternatively, the system can also establish policies that indicate that any system action can be considered as unintentional, for example changes to configuration files, logs or the like. If the files were not intentionally changed (e.g., files loaded into a "temp" directory), these files are ignored at step 430 and the method returns to step 410 where the tracking continues. Thus, the system can include or exclude such data (or metadata) depending on the established our policy.

Alternatively, if the personal data tracking module 310 determines that the user files were changed intentionally (e.g., in response to a user action using one of the third-party services), the method proceeds to step 435, where the data storage module 340 transmits the modified user files to data archive 250 for storage therein as described above. More particularly, the data changes are recorded on cloud storage (e.g., data archive 250) at step 435 and, at step 440, the stored data is encrypted and any legal requirements are applied to storing the data if it contains any personal user data (e.g., social security number, driver license number, and the like). For example, the personal data backed-up onto data archive 250 can be encrypted, digitally signed, and/or encrypted using homomorphic encryption, for example. As one option, the encryption key can be based on biometric data or derived from a device embedded/implanted into a body of the user to avoid personal data leakage. In any event, after data encryption, at step 445, the data is backed up on the data archive before the method ends at step 450.

Thus, according to the exemplary method described herein, the system is directed at monitoring two aspects: the devices used by the user, and, inside those devices, the activities that the user performs, which can be tracked for personal data that should be stored or backed up somewhere, typically on the cloud. As described above, according to one aspect, the user rules definition module 320 is provided to determine which personal data should be monitored and backed up, i.e., such personal data is selected based on user defined policies and rules. For example, this user data can include all files modified by specific applications (such as word processors, Microsoft Word, graphical editors, Excel, Pages, Notes, Microsoft Office components, and the like). As such, personal data can be derived from the activities of these applications that, for example, if a particular application modifies a record in a database, invokes a web service, modifies a table, and so on—these indirect modifications of the data can be tracked by an agent that resides on a particular device and are backed up to the cloud.

Moreover, according to one aspect, the personal data can also include configuration files of the applications that are external to the particular device (e.g., the personal data can reside on a server or within a virtual environment, such as a virtual machine or container), user preferences (e.g., as they relate to appearance of a display, skins, and the like), registry entries in Microsoft Windows, web service configurations and user parameters, any cookie information, and the like. Moreover, the personal data can be backed up as files (i.e., the modified files), or can be backed up as entries in a special database that resides on the cloud. For example, as explained above, in one aspect personal data can exist not as files, but rather as a set of entries that collect information about user actions, etc., such as the metadata described above.

Moreover, using the user rules definition module 320, it is contemplated that the user can define the rules, based on which the personal data is captured and backed up, as described above. This configuration is somewhat analogous to backup software that runs on each device, except that the rules are specific to personal data, rather than the conventional arrangement where the backup software simply checks for whether some file or block changed since the last time it checked. In one aspect, an agent can be installed on the computer device and/or mobile device itself, or it can be installed on communication components, such as communication lines and routers, to monitor user actions relating to the data. Also, in a closed system, such as a corporate network, the component that tracks the personal data for backup can be installed on the hardware components of the network, for example. Also, in the case of mobile telephones or similar, a control device can be added to a phone, any like the control of the phone through TCP/IP, a network connection, and the like on. This configuration permits, for example, reading the video of the screen and backing it up, for example. The data can be sent to the cloud in raw form, and an application on the cloud can then determine which data represents the personal data that they use or wants backed up. In other words, this places most of the intellect on the cloud as opposed to another device, at the price of possibly increasing the traffic requirements.

It should be appreciated that the data management and backup process described herein can be applied both to virtualized and non-virtualized system, for example, and it can apply to virtual machines and/or containers, but it can also apply to specific blocks of a storage device of a virtual machine, even if the host operating system does not have visibility into what applications the virtual machine is running.

According to a further refinement of the exemplary aspect, the user of computer 110 can interact with the backed-up data in data archive 250 through a centralized administrative service. For example, a separate application running on a server and/or having a corresponding client on the one or more user devices can give the user visibility to the personal data that is backed up. Also, the application can determine the attributes of the data, which device the data came from, which software application program on which device changed and/or created and/or modified the data in question. Moreover, to recover the data from data archive 250, the application on running the cloud can analyze the data that was changed and export the data to the same device and/or to a different device, i.e., in other words, the recovery of the data is not limited to the specific device on which the data was created. Moreover, in the case of virtual machines, the entire virtual machine can be restored on another device, or only the data of the virtual machine can be restored on the other device.

As a further option of an exemplary aspect, interfaces of two external applications can be used, such as Dropbox, for example. A software agent installed on the personal device (such as computer 110 or a secondary device 220A or 220B)

can automatically interface to such external applications, and automatically backup the data to a particular folder in Dropbox, as one example.

Also, instead of backing up the entire modified file, a link to the file can be stored instead of files, together with a time stamp initiating when the data was changed.

Additionally, the personal data backup agent can use interfaces to the external applications, and particularly to services, such as Facebook, Twitter, Tumblr, Flickr, Instagram, and the like. The agent (i.e., personal data tracking module 310) can track the activity of the user by tracking the fact that the user has activated the relevant applications that interface to the third-party services, such as social networks, Instagram type applications, Twitter, and the like, and track the activity by the user in that manner. Additionally, the agent can track the history of a user's visits to specific URLs, particularly where the URLs are indicative of specific activities, such as forums, blogs, online shopping, and so on. The agent can also track both the users of posts and responses/comments to them. As such, the user also can back up everything or backup selectively (for example, the system can back up Twitter, but not Facebook, can back up some online shopping, but not all of it, and so on). This can all be set by the user rules definition module 320, which in one aspect enables the user to identify the applications and/or personal devices of which user activity should be tracked.

Thus, according to the system and method disclosed herein, there can generally be two sources of personal data: on-device detection, including detection of activities based on communication sniffers, and detection of data that is completely external to the user's device, which tracks activity outside of device or cloud using different approaches to dig data, for example, to follow social network/Twitter/blogs using APIs from these service, using account access of special "friends" accounts created to monitor activity of a particular user, and the like. As a further option, in a corporate network, access to the user's data that is backed up to the clouds can be given to the IT department. Moreover, external applications that are intended for generation of content, such as WordPress, can also be tracked in the same manner.

Additionally, in one aspect, user activity can be tracked by initiating an online search based on certain parameters, for example, the user's name, nicknames, and other metadata known by the user, and the like. Again, this configuration can be set using the user rules definition module 320, which enables the user to access a rules engine that allows the user to define the settings for the personal data tracking module 310 in regards to which activities can be set. In this aspect, the user's search activity in search engines, as well as search results from the search engines, can also be treated as personal data.

In the case of online shopping, the pages the user has visited, the products the user viewed, can also be saved as personal data in the same manner. Also, if a camera is available, the movements of the user's eyes and which portions of the screen (for example, in the case of online shopping, which product) he or she was looking at, can be saved. Later, the application for giving the user access to his backup personal data can have an option to respond to a query along the lines of "which television set was I looking at yesterday?"

In a further refinement of the exemplary aspect, the user can also have an editor that permits them to edit and/or delete the backed up personal data. In this aspect, the editor (or related application) can also use the backed up data for further analysis as well as to identify and record human behavior (e.g., user actions) through artificial intelligence, generate user avatars, robots, bots and any other systems, which can simulate the user's customs, behaviors, reactions for different typical situation. Thus, the actions of the user can be used to profile the user and the user's behavior for further actions and applications.

Finally, in the case of a mobile phone and a camera, if the camera is enabled, the agent can track what is viewed by the camera, and can back up some of the images and/or video stream to the cloud. Also, GPS coordinates can be tracked and backed up to the cloud as well, to the extent the user might want to later recover his geographic path as he was moving (for example, as he was walking past a store, down the street, etc.).

Figure 5:
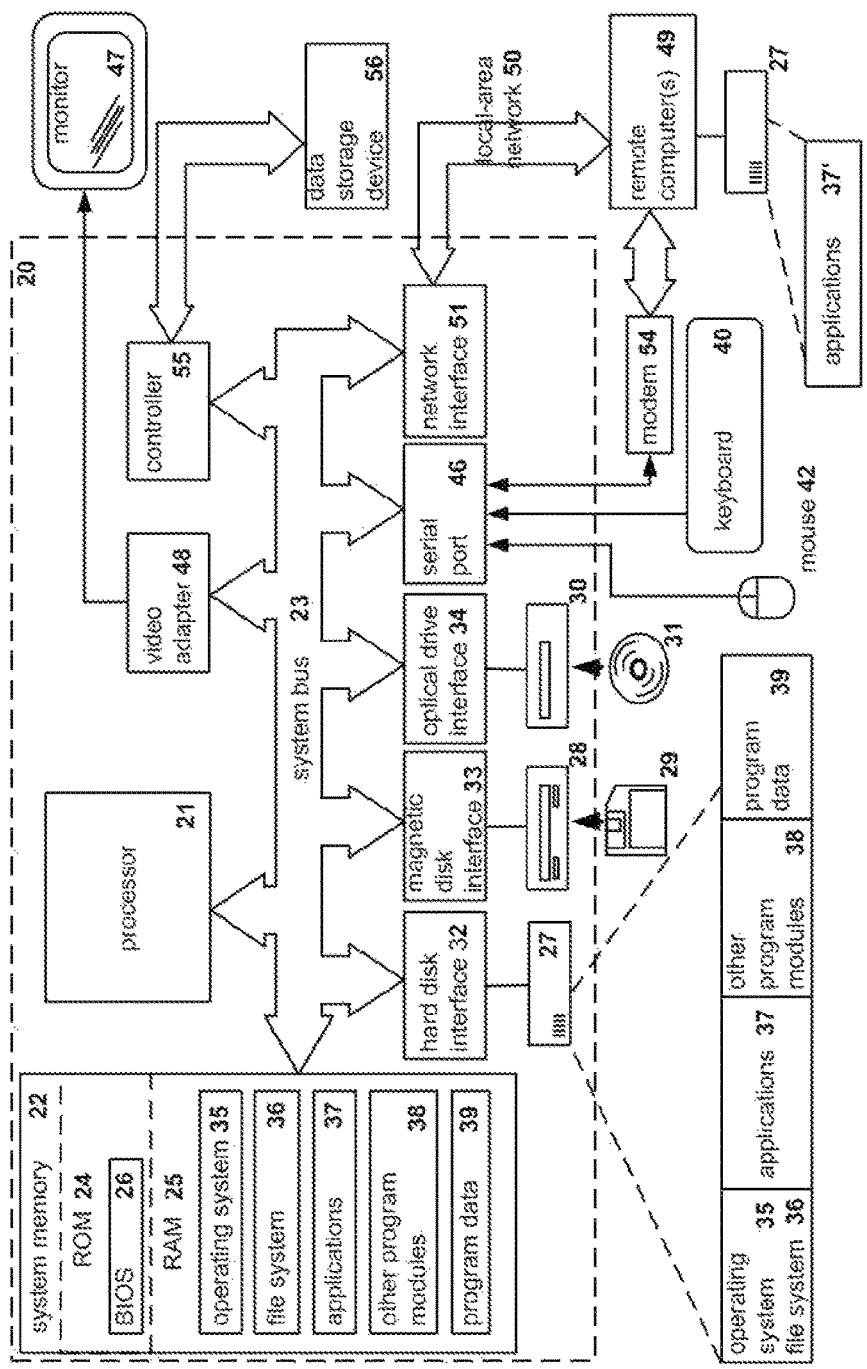
FIG. 5 illustrates an example of a general-purpose computer system on which the disclosed systems and method can be implemented.

FIG. 5 illustrates an example of a general-purpose computer system (which may be a personal computer or a server) on which the disclosed systems and method can be implemented according to an example aspect. It should be appreciated that the detailed general-purpose computer system can correspond to the computer 110 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 212 and the system memory 22 can correspond to memory 218 of FIG. 2, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for backing up electronic user data, the method comprising:
   continuously tracking, by a processor, user actions performed on a plurality of devices belonging to the user;
   determining, by the processor, whether one or more of the tracked user actions has modified user data comprising data files on each of the plurality of user devices and external data associated with at least one external online resource;
   determining whether the modification to the data files is an unintentional result of the one or more tracked user actions based on a set of classification rules that comprise: determining that the modification is an unintentional result when changes are made within a predetermined directory and determining that the modification is an intentional result when the changes are made by a predetermined list of operations executed by a predetermined list of applications;
   discarding the modification to the data files if changes to the data files are determined to be unintentional;
   checking if the user data associated with the at least one external online resource is unique in a data archive; and
   if the processor determines that the user data is unique, adding the user data to the data archive.

2. The method of claim 1, wherein the data archive is a remote cloud storage system and the method further comprises encrypting the user data.

3. The method of claim 1, wherein the determining of whether the one or more the tracked user actions has modified the data comprises:
   detecting changes in the user data as a result of an intentional modification by the user of the at least one user device; and
   storing only intentionally user modified data in the data archive.

4. The method of claim 3, wherein the set of classification rules comprise at least one of: executing the modifications in specified applications indicates intentional actions, and execution of system actions is unintentional.

5. The method of claim 1, wherein the continuously tracking of user actions comprises continuously tracking the plurality of user devices to detect interactions with the at least one external resource.

6. The method of claim 1, wherein the at least one external resource comprises at least one of an online blog, online social networks, an online shopping environment, an online banking environment, and an online gaming system.

7. The method of claim 1, further comprising:
   obtaining metadata relating to the user actions that modified the user data file; and
   storing the metadata with the modified user data in the data archive.

8. The method of claim 7, further comprising:
generating a user profile based on the metadata relating to the user actions using artificial intelligence to generate one or more of avatars, robots and bots to simulate one or more of the user's customs, behaviors or reactions; and
applying the user's customs, behaviors or reactions for further actions and applications.

9. The method of claim 1, wherein the user data comprises at least one of digital images, video, electronic messages and cell phone data.

10. The method of claim 1, further comprising:
identifying user identification data to confirm that the user is a user of the plurality of devices prior to adding the modified data to the data archive.

11. The method of claim 1, further comprising:
determining whether one or more modifications have been performed by the user; and
storing a history of the modification of the data in the data archive.

12. The method of claim 1, further comprising:
determining whether the data is user modified or system modified; and
adding only user modified data to the data archive.

13. A system for backing up electronic user data, the system comprising: a processor configured to:
continuously track user actions performed on a plurality of devices belonging to the user;
determine whether one or more of the tracked user actions has modified user data comprising data files on each of the plurality of user devices and external data associated with at least one external online resource;
determine whether the modification to the data files is an unintentional result of the one or more tracked user actions based on a set of classification rules that comprise: determining that the modification is an unintentional result when changes are made within a predetermined directory and determining that the modification is an intentional result when the changes are made by a predetermined list of operations executed by a predetermined list of applications;
discarding the modification to the data files if changes to the data files are determined to be unintentional;
checking if the user data associated with the at least one external online resource is unique in a data archive; and
if the processor determines that the user data is unique, add the modified user data to the data archive.

14. The system of claim 13, wherein the data archive is a remote cloud storage system that is configured to encrypt the modified user data.

15. The system of claim 13, wherein the processor is further configured to:
determine whether the one or more the tracked user actions has modified the user data by detecting changes in the user data as a result of an intentional modification by the user of the at least one user device; and
store only intentionally modified data in the data archive.

16. The system of claim 15, wherein wherein the set of rules of classification comprise at least one of: executing the modifications in specified applications indicates intentional actions, and execution of system actions is unintentional.

17. The system of claim 13, wherein the processor is further configured to continuously track the user actions by continuously tracking the plurality of user devices to detect interactions with the at least one external resource.

18. The system of claim 13, wherein the at least one external resource comprises at least one of an online blog, online social networks, an online shopping environment, an online banking environment, and an online gaming system.

19. The system of claim 13, wherein the processor is further configured to:
obtain metadata relating to the user actions of interacting with the at least one external resource that modified the user data; and
store the metadata with the modified user data in the data archive.

20. The system of claim 19, wherein the processor is further configured to:
generate a user profile based on the metadata relating to the user actions using artificial intelligence to generate one or more of avatars, robots and bots to simulate one or more of the user's customs, behaviors or reactions; and
applying the user's customs, behaviors or reactions for further actions and applications.

21. The system of claim 13, wherein the plurality of user data files comprises at least one of digital images, video, electronic messages and cell phone data.

22. The system of claim 13, wherein the processor is further configured to continuously track user actions that interact with the at least one external resource and are performed by a device other than the at least one user device.

23. A non-transitory computer readable medium storing computer executable instructions for backing up electronic user data, including instructions for:
continuously tracking user actions performed on a plurality of devices belonging to the user;
determining whether one or more of the tracked user actions has modified user data comprising data files on each of the plurality of user devices and external data associated with at least one external online resource;
determining whether the modification to the data files is an unintentional result of the one or more tracked user actions based on a set of classification rules that comprise: determining that the modification is an unintentional result when changes are made within a predetermined directory and determining that the modification is an intentional result when the changes are made by a predetermined list of operations executed by a predetermined list of applications;
discarding the modification to the data files if changes to the data files are determined to be unintentional;
checking if the user data associated with the at least one external online resource is unique in a data archive;
if the user data is unique, adding the modified user data to the data archive.

* * * * *